(12) United States Patent
Hansen et al.

(10) Patent No.: US 10,588,375 B2
(45) Date of Patent: Mar. 17, 2020

(54) ULTRA-RESILIENT PAD

(75) Inventors: Robert A. Hansen, Stuttgart-Birkach (DE); Bjorn Rydin, Horby (SE); Glenn Kornett, Bonneau, SC (US)

(73) Assignee: Albany International Corp., Rochester, NH (US)

( * ) Notice: Subject to any disclaimer, the term of this patent is extended or adjusted under 35 U.S.C. 154(b) by 610 days.

(21) Appl. No.: 12/345,215

(22) Filed: Dec. 29, 2008

(65) Prior Publication Data
US 2009/0181590 A1 Jul. 16, 2009

Related U.S. Application Data

(60) Provisional application No. 61/017,447, filed on Dec. 28, 2007.

(51) Int. Cl.
| | |
|---|---|
| B32B 5/12 | (2006.01) |
| A43B 1/04 | (2006.01) |
| A43B 13/18 | (2006.01) |
| D04H 3/04 | (2012.01) |
| D03D 7/00 | (2006.01) |
| B32B 5/26 | (2006.01) |
| B32B 5/08 | (2006.01) |
| D03D 15/08 | (2006.01) |
| D06N 7/00 | (2006.01) |

(52) U.S. Cl.
CPC .............. *A43B 1/04* (2013.01); *A43B 13/181* (2013.01); *B32B 5/08* (2013.01); *B32B 5/12* (2013.01); *B32B 5/26* (2013.01); *D03D 7/00* (2013.01); *D03D 15/08* (2013.01); *D04H 3/04* (2013.01); *D06N 7/0068* (2013.01); *Y10T 442/3024* (2015.04)

(58) Field of Classification Search
CPC .................................. D03D 15/08; B32B 5/12
USPC ......... 442/50, 328, 329, 334, 335, 338, 366, 442/381, 389, 392, 414, 415, 416
See application file for complete search history.

(56) References Cited

U.S. PATENT DOCUMENTS

| | | | | |
|---|---|---|---|---|
| 2,919,217 | A * | 12/1959 | Bobkowicz | ................... 428/108 |
| 2,919,467 | A * | 1/1960 | Mercer | ............... B29C 47/0033 |
| | | | | 156/167 |
| 3,316,136 | A * | 4/1967 | Pufahl | ................... D06M 17/00 |
| | | | | 156/160 |
| 3,384,692 | A * | 5/1968 | Galt | .................... B29C 47/0033 |
| | | | | 156/167 |

(Continued)

FOREIGN PATENT DOCUMENTS

| | | |
|---|---|---|
| CN | 1914373 B | 5/2010 |
| DE | 42 02 325 A | 8/1993 |

(Continued)

OTHER PUBLICATIONS

Definition "loom" Complete Textile Glossary, Celanese Acetate LLC, Copyright 2001 (no month).*

(Continued)

*Primary Examiner* — Andrew T Piziali
(74) *Attorney, Agent, or Firm* — McCarter & English, LLP

(57) ABSTRACT

A structure for use in a compressible resilient pad. The structure contains both axially elastomeric yarns and relatively inelastic yarns in various patterns. The structure has a high degree of both compressibility under an applied normal load and excellent recovery (resiliency or spring back) upon removal of that load.

17 Claims, 10 Drawing Sheets

(56) References Cited

U.S. PATENT DOCUMENTS

| | | | |
|---|---|---|---|
| 3,537,928 A * | 11/1970 | Maglio | D06N 3/005 |
| | | | 156/220 |
| 3,553,857 A | 1/1971 | Isham et al. | |
| 3,723,218 A * | 3/1973 | Gaffney | B29C 47/0033 |
| | | | 156/167 |
| 3,733,721 A | 5/1973 | Clemens | |
| 3,815,645 A | 6/1974 | Codorniu | |
| 4,088,805 A * | 5/1978 | Wiegand | B29C 44/12 |
| | | | 442/370 |
| 4,328,840 A * | 5/1982 | Fontana | 139/419 |
| 4,328,841 A * | 5/1982 | Fontana | 139/419 |
| 4,350,731 A | 9/1982 | Siracusano | |
| 4,555,440 A | 11/1985 | Crook | |
| 4,608,768 A | 9/1986 | Cavanagh | |
| 4,781,967 A | 11/1988 | Legge et al. | |
| 4,870,998 A * | 10/1989 | Westhead | 139/383 A |
| 4,931,358 A | 6/1990 | Wahl et al. | |
| 4,979,543 A | 12/1990 | Moriarty et al. | |
| 5,087,327 A | 2/1992 | Hood | |
| 5,360,656 A | 11/1994 | Rexfelt et al. | |
| 5,368,696 A | 11/1994 | Cunnane, III et al. | |
| 5,401,564 A | 3/1995 | Lee et al. | |
| 5,436,052 A * | 7/1995 | Basse | B21F 27/20 |
| | | | 428/105 |
| 5,480,646 A | 1/1996 | Vu | |
| 5,560,401 A * | 10/1996 | Miglus | 139/383 R |
| 5,597,450 A | 1/1997 | Baker et al. | |
| 6,001,460 A * | 12/1999 | Morman | B32B 5/04 |
| | | | 428/195.1 |
| 6,039,821 A | 3/2000 | Buck | |
| 6,158,576 A * | 12/2000 | Eagles | B65G 43/02 |
| | | | 198/810.01 |
| 6,179,965 B1 | 1/2001 | Cunnane, III et al. | |
| 6,391,420 B1 * | 5/2002 | Cederblad et al. | 428/107 |
| 6,413,889 B1 | 7/2002 | Best et al. | |
| 6,723,208 B1 | 4/2004 | Hansen | |
| 2002/0072290 A1 | 6/2002 | Johnson | |
| 2002/0100572 A1 | 8/2002 | Cunnane, III | |
| 2002/0162246 A1 | 11/2002 | Mayer et al. | |
| 2003/0217484 A1 | 11/2003 | Christensen et al. | |
| 2003/0228815 A1 | 12/2003 | Bhatnagar et al. | |
| 2004/0005832 A1 | 1/2004 | Neculescu et al. | |
| 2004/0023582 A1 | 2/2004 | Espe | |
| 2004/0219854 A1 | 11/2004 | Groitzsch et al. | |
| 2005/0081570 A1 | 4/2005 | Karlsson et al. | |
| 2006/0029772 A1 | 2/2006 | Huang et al. | |
| 2006/0278328 A1 | 12/2006 | Westerkamp et al. | |
| 2007/0163741 A1 | 7/2007 | Crook | |
| 2007/0194490 A1 | 8/2007 | Bhatnagar et al. | |
| 2007/0202314 A1 | 8/2007 | Youn et al. | |
| 2008/0166533 A1 | 7/2008 | Jones et al. | |
| 2009/0176427 A1 | 7/2009 | Hansen et al. | |
| 2009/0181590 A1 | 7/2009 | Hansen et al. | |
| 2010/0129597 A1 | 5/2010 | Hansen et al. | |
| 2012/0189806 A1 | 7/2012 | Hansen et al. | |

FOREIGN PATENT DOCUMENTS

| | | | |
|---|---|---|---|
| DE | 10 2004 038770 | | 2/2006 |
| EP | 0306313 | A | 3/1989 |
| EP | 0505788 | A | 3/1992 |
| EP | 1302578 | A | 4/2003 |
| EP | 1386723 | A | 2/2004 |
| EP | 1568808 | A | 8/2005 |
| EP | 1 719 834 | A | 11/2006 |
| GB | 1118784 | | 7/1968 |
| GB | 2197886 | A | 6/1988 |
| JP | 2003-193326 | A | 7/2003 |
| WO | WO 93/17180 | A | 9/1993 |
| WO | WO 2004/005018 | A | 1/2004 |
| WO | WO 2004/072368 | A | 8/2004 |
| WO | WO 2005/075734 | A | 8/2005 |
| WO | WO 2007/067949 | A | 6/2007 |
| WO | WO 2009/086533 | A | 7/2009 |
| WO | WO 2010/030298 | A | 3/2010 |

OTHER PUBLICATIONS

BPAI Decision on Appeal, U.S. Appl. No. 10/699,997, mailed Dec. 19, 2011.*

Definition "laminated" Merriam-Webster Dictionary, http://www.merriam-webster.com/dictionary/laminated, (no date).*

Definition "laminated" Merriam-Webster's Collegiate Dictionary, Eleventh Edition, cover page and p. 698, (no date).*

International Search Reportand Written Opinion from EPO for PCT/US2008/088478 dated Jul. 2, 2009.

International Search Reportand Written Opinion from EPO for PCT/US2008/088450 dated Apr. 15, 2009.

International Search Report and Written Opinion from EPO for PCT/US2010/036398 dated Sep. 15, 2010.

International Search Reportand Written Opinion from EPO for PCT/US2010/036385 dated Oct. 7, 2010.

International Search Reportand Written Opinion from International Application PCT/US2012/022029.

International Search Reportand Written Opinion from International Application PCT/US2012/022035.

Notification of First Office Action, including search report, issued by Chinese Patent Office for corresponding Chinese application 201280009844.1 dated Sep. 3, 2014, English translation only.

* cited by examiner

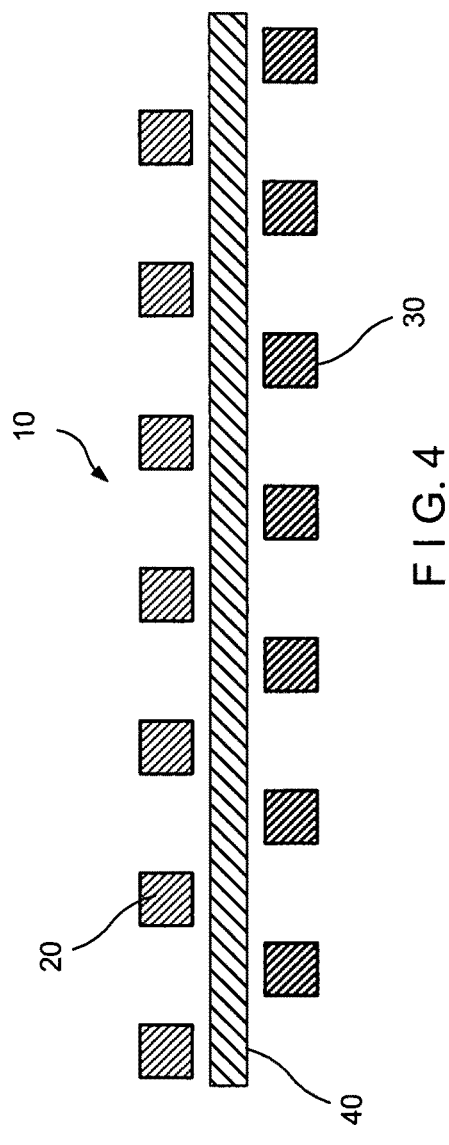
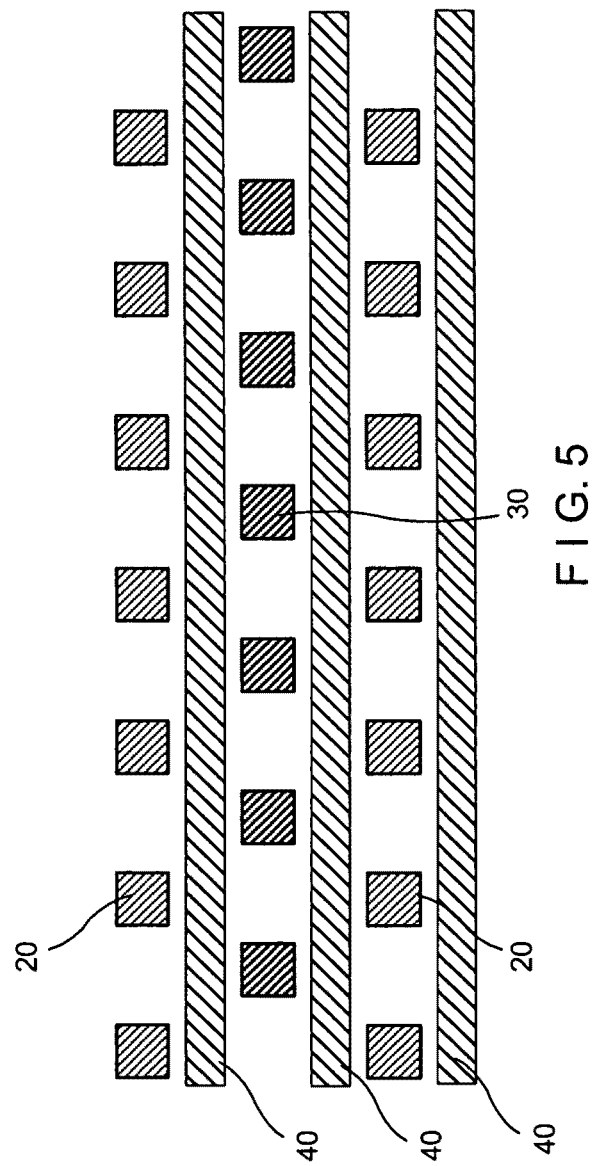

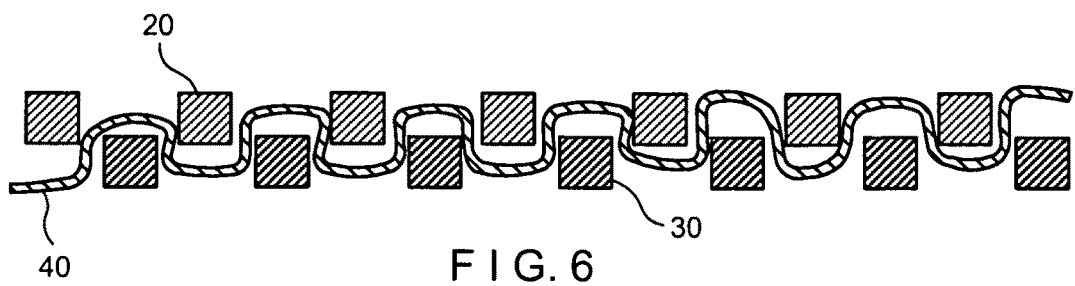
F I G. 6
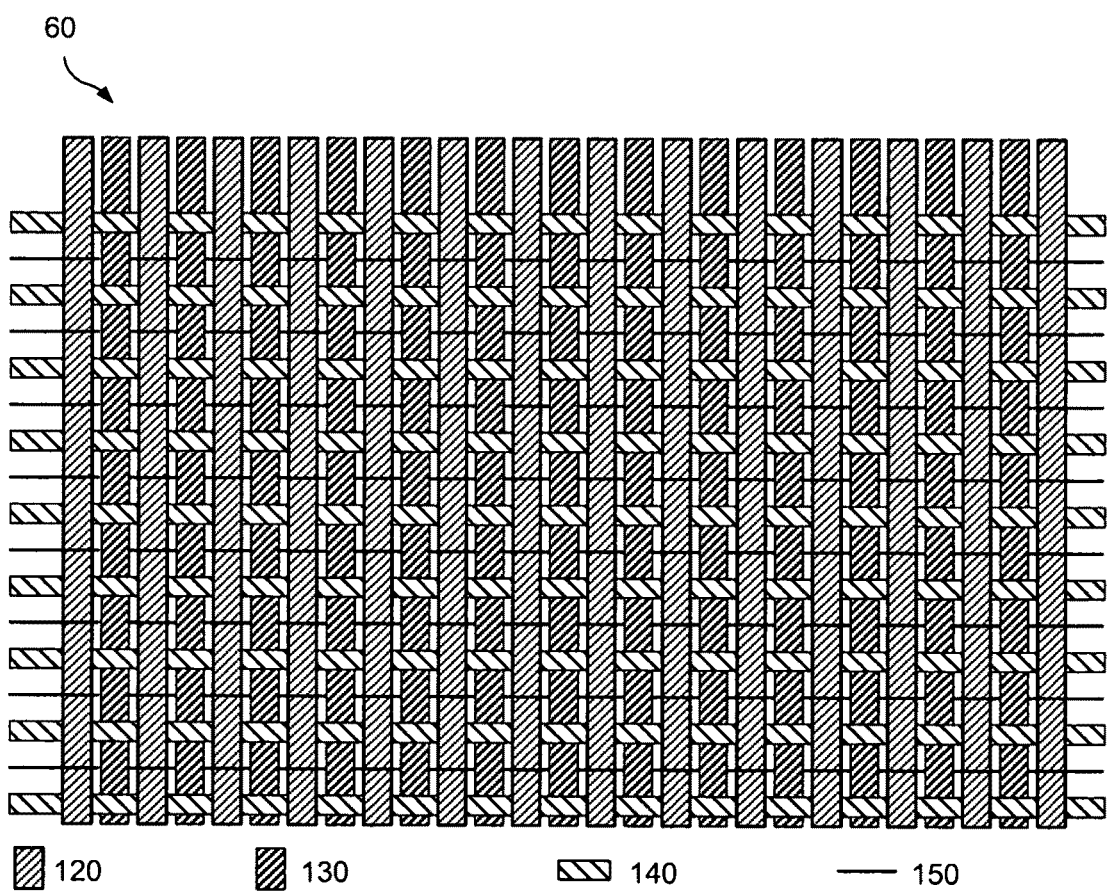
☒ 120  ☒ 130  ⟍ 140  — 150
F I G. 7

ULTRA-RESILIENT PAD

CROSS-REFERENCE TO RELATED APPLICATION

This application claims priority benefits of U.S. Provisional Patent Application Ser. No. 61/017,447 filed Dec. 28, 2007, the disclosure of which is incorporated herein by reference.

BACKGROUND OF THE INVENTION

Field of the Invention

The present invention relates to a compressible/resilient structure for various uses such as, for example, athletic shoes, regular shoes, boots, floor carpets, carpet pads, sports floors etc. The structure itself can be the final product or the structure can be a component of another structure. Uses envisioned include, but are not limited to: automobile parts and other composites; flooring; subfloors especially in gymnasiums or other sports arenas; press pads; ballistic cloth such as body armor or hurricane window protection; sporting equipment padding such as baseball catcher chest protectors; knee/elbow pads for runners, racers, skaters, volleyball players; cricket shin/knee pads; football hip pads; wall padding in stadiums, gymnasiums, arenas; shoe inserts (orthotics); heels/soles for athletic shoes e.g. running shoes; cushioning layer for bedding, vehicle seats, pillows; and other industrial uses where through thickness compressibility and resiliency is required.

Description of Prior Art

While composites are usually a fiber reinforced resin matrix that is rigid and incompressible in all dimensions, certain uses such as for automobile bumpers require some flexibility and shock absorbing capability, plus the ability to return to the original shape once an impact force is removed. A bumper with the inventive structure as a layer, the structure layer free of resin in its interior to allow movement as desired, is an improvement over that currently used.

U.S. application No. 2007/0202314, PCT application WO 2007/067949 and U.S. application No. 2007/0194490 are examples where "crossless" structures are used as the substrate. Substitution of the present invention for at least some of these layers, the inventive layers not impregnated with resin to allow through thickness compression and spring back, results in an improved structure.

The present invention can also be used as shoe inserts or orthotic inserts, which are usually molded solid resin. Incorporation of a layer of the present invention improves the cushioning effect thereof. Soles/heels for sports shoes, which are usually solid viscoelastomeric materials, some attempts to improve "cushioning" have been to mold in for example "air channels or pockets." However, the rigidity of the molded material is such that cushioning effects are limited. Incorporation of the present invention as a layer in the cast structure, free of "resin" to allow movement, substantially improves the cushioning effect of running/athletic shoes.

Therefore, it would be an advancement in the state of the "pad-making" art to provide a pad that provides excellent elastic behavior under load with high through thickness recovery.

SUMMARY OF THE INVENTION

The present invention is a 'shock-absorbing pad' that utilizes a unique structure which provides extremely elastic behavior under load with high through thickness recovery. The instant structure utilizes an elastic media in any direction, which allows the entire structure to 'collapse' into itself, based primarily upon the elasticity of this media and the structure to conform under pressure, thus allowing this unique behavior.

One embodiment of the invention is an ultra-resilient pad for use in a sports shoe, running shoes, regular shoes, boots etc. The structure may be a woven or nonwoven fabric including functional yarns in a longitudinal direction, layered both over as well as under the elastic media layered in a cross-direction. The elastic media used in the cross-direction may be polyurethane, rubber or Lycra or any deformable material that has sufficient elasticity as well as strength to allow the structure to compress and rebound, or 'spring back.' The entire structure can be 'bound' together utilizing a "binder pick," or another yarn that is woven into the structure in order to bind the structure together to allow further processing of the said "base fabric." Other means such as adhesives, welding technology or laser bonding can also be utilized for this bonding function.

The invention according to one embodiment is an ultra-resilient 'carpet pad' for use in floor carpets, sports floor, floor coverings etc. The structure may be a woven or nonwoven fabric including functional yarns in a longitudinal direction, layered both over as well as under the elastic media layered in a warp direction. The elastic media used in the warp direction may be polyurethane, rubber or Lycra or any deformable material that has sufficient elasticity as well as strength to allow the structure to compress and rebound, or 'spring back.' The entire structure can be 'bound' together utilizing a "binder pick," or another yarn that is woven into the structure in order to bind the structure together to allow further processing of the said "base fabric." Other means such as adhesives, welding technology or laser bonding can also be utilized for this function.

An object of the invention is to provide a structure that has improved recovery characteristics over memory foams, gels, spring systems, etc.

Another object of the invention is to form a smooth and uniform surface over the pad in order to improve support for the shoe and the foot.

Yet another object of the invention is to form a 'planar,' crossless structure of yarns with improved support of the carpet/sport floor/floor material.

Yet another object of the invention is to provide excellent retention of the recovery/dampening characteristics by utilizing the elastic material's 'full' recovery within the structure, as opposed to straight compression of materials. This is achieved due to the structure providing support between the sections of the elastic material, which avoids 'overstressing' the material, keeping it 'alive' and resulting in a longer useful lifetime.

Yet another object of the invention is to provide excellent resistance to moisture damage or problems due to water holding in certain applications due to the self-cleaning effect due to compression and subsequent recovery.

Yet another object of the invention is to provide an excellent compression recovery versus weight ratio, allowing significant dampening capability with light weight on structures.

Yet another object of the invention is to provide excellent 'breathability' of the shock absorbing structure, allowing perspiration and other moisture to evaporate and/or be removed during the compression phase.

For a better understanding of the invention, its operating advantages and specific objects attained by its uses, reference is made to the accompanying descriptive matter in which preferred, but non-limiting, embodiments of the invention are illustrated.

Accordingly, disclosed is a compressible resilient pad, wherein the pad includes a structure comprising: a plurality of parallel warp yarns and a plurality of parallel shute yarns, wherein either or both of shute yarns or warp yarns are comprised of an axially elastomeric material. The structure comprises a first layer of the parallel yarns running in either the warp or the shute direction, a second layer of the parallel yarns on one side of the first layer, the second layer's yarns running in the warp or shute direction different from that of the first layer and comprising the elastomeric yarns and a third layer of the parallel yarns on the opposite of the second layer as the first layer and running in the same direction as those of the first layer. The parallel yarns of the third layer are aligned such that they nest between the spaces created between the parallel yarns of the first layer. The structure can further comprise a binder yarn. In the pad the number of yarns in the third layer can be less than the number of yarns in the first layer. The yarns of the second layer can be orthogonal to those of the first and third layers. The second layer can be at an angle of less than 90 degrees of the first and third layer, such as at an angle of 45 degrees.

The pad's structure can comprise a fourth layer of parallel yarns in the same direction as the second layer, the yarns comprising the elastomeric material, and a fifth layer of parallel yarns in the same direction as the first layer, wherein the yarns of the fifth layer are aligned in the same vertical plane in a through thickness direction as that of the first layer.

In yet another embodiment, disclosed is a compressible resilient pad, wherein the pad includes a structure comprising: a plurality of warp yarns, a plurality shute yarns, wherein any number of the shute yarns and warp yarns are interwoven to form a woven structure; and wherein any number of the yarns are comprised of an axially elastomeric material. The pad of can further comprise a binder yarn. In one embodiment, the pad can comprise a 2-8-shed pattern.

It will be noted that in each of the embodiments described herein, elastomeric material can be incorporated into any of the warp and shute yarns to give the desired qualities of compressibility and resilience. Also, any number of layers can include any number of elastomeric yarns.

The elastomeric yarn including the elastomeric material can be selected from the group consisting of: a monofilament, a multifilament, a plied monofilament, a wrapped yarn, a knitted yarn, a hooked loop yarn, a twisted yarn, a multicomponent yarn, and a braided yarn. The elastomeric yarn can also be selected from the group consisting of: a polyurethane, a rubber, and Lycra®. The elastomeric yarn can be selected from yarns having a cross-section of differing geometric configurations, such as round, non-round, square, rectangular, elliptical, and polygonal.

In the disclosure and the embodiments therein, the pad's structure can comprise a laminated structure. The laminated structure can include two woven layers with an elastomeric layer there between. The laminated structure can also include a binder yarn weaving between the layers.

In the disclosure and the embodiments therein, the pad of can also include a structure where the binder yarn and the elastomeric yarn are in the same direction. The direction of the elastomeric yarn and the binder yarn are the warp direction. Such a structure can include a layer of elastomeric yarns that are inside a double layer construction. In the pad the structure can include the elastomeric yarns composed of a coarser warp, and the binder yarn composed of a warp smaller than that of the elastomeric yarn. The structure can also comprise the elastomeric yarns in the warp, the shute yarns over the elastomeric yarns, and wherein the binder yarns are smaller than the elastomeric yarns.

In the disclosures and the embodiments herein, the pad's structure can comprise four ends weaving above the layer of elastomeric yarns and changes over to a two-layer binder, and four ends weaving under the layer of elastomeric yarns and goes over to a two-layer binder every second repeat.

The pad' structure can comprise a single layer including the elastomeric yarn, and a functional yarn in the same direction and alternating with the elastomeric yarn, wherein the elastomeric yarn is larger than the functional yarn.

In the disclosure and the embodiments herein, in the pad, the structure can be either a final product or the structure can be a component of another structure. The pad can be included in or can be a product selected from the group of products including footwear; shoes; athletic shoes; boots; flooring; carpets; carpet pads; sports floors; automobile parts; composites; subfloors; gymnasium subfloors; sports arena subfloors; press pads; ballistic cloth; body armor; hurricane window protection; padding; sporting equipment padding; baseball catcher chest protectors; knee/elbow pads; hip pads; wall padding; shoe inserts and orthotics; heels/soles for athletic shoes; a cushioning layer for bedding, and vehicle seats. The structure can also include a material that allows a surface to be exchangeable; the material can be a hooked loop yarn.

In the disclosure and the embodiments herein, the layers of the structure can comprise a plurality of adjoining layers comprising the elastic material.

Terms "comprising" and "comprises" in this disclosure can mean "including" and "includes" or can have the meaning commonly given to the term "comprising" or "comprises" in US Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF DRAWINGS

The accompanying drawings, which are included to provide a further understanding of the invention, are incorporated in and constitute a part of this specification. The drawings presented herein together with the description serve to explain the principles of the invention. In the drawings:

FIG. 4 shows the formation of a structure, according to one embodiment of the invention.

FIG. 5 shows yet another step in the formation of a structure, according to one embodiment of the invention.

FIG. 6 shows yet another step in the formation of a structure, according to one embodiment of the invention.

FIG. 7 shows a woven structure, according to one embodiment of the invention.

DETAILED DESCRIPTION OF THE INVENTION

The invention, according to one embodiment, is a 'shock-absorbing' pad that utilizes a unique structure which provides extremely elastic behavior under a normal pressure load with high caliper recovery. This structure 10 utilizes an elastic media in one direction of a woven or non-woven structure or fabric, which allows the entire structure to 'collapse' into itself, based upon the elasticity of this media and the base fabric structure to conform under pressure, and then recover to substantially the same original form and thickness, thus allowing a unique behavior.

Figure 1:
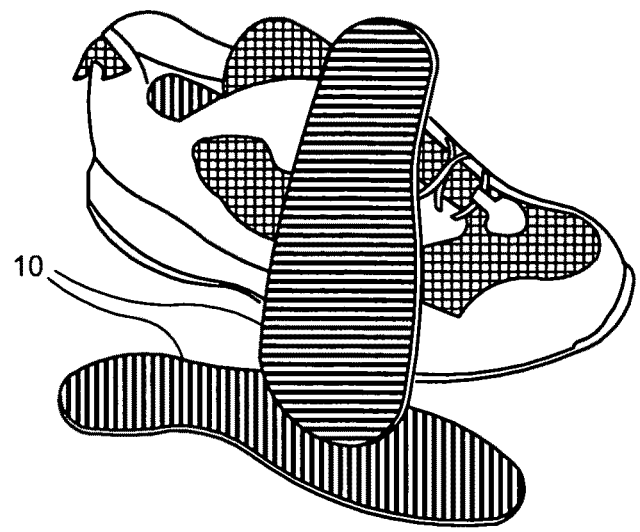
FIG. 1 shows an ultra-resilient shoe pad, according to one embodiment of the invention.
Figure 2:
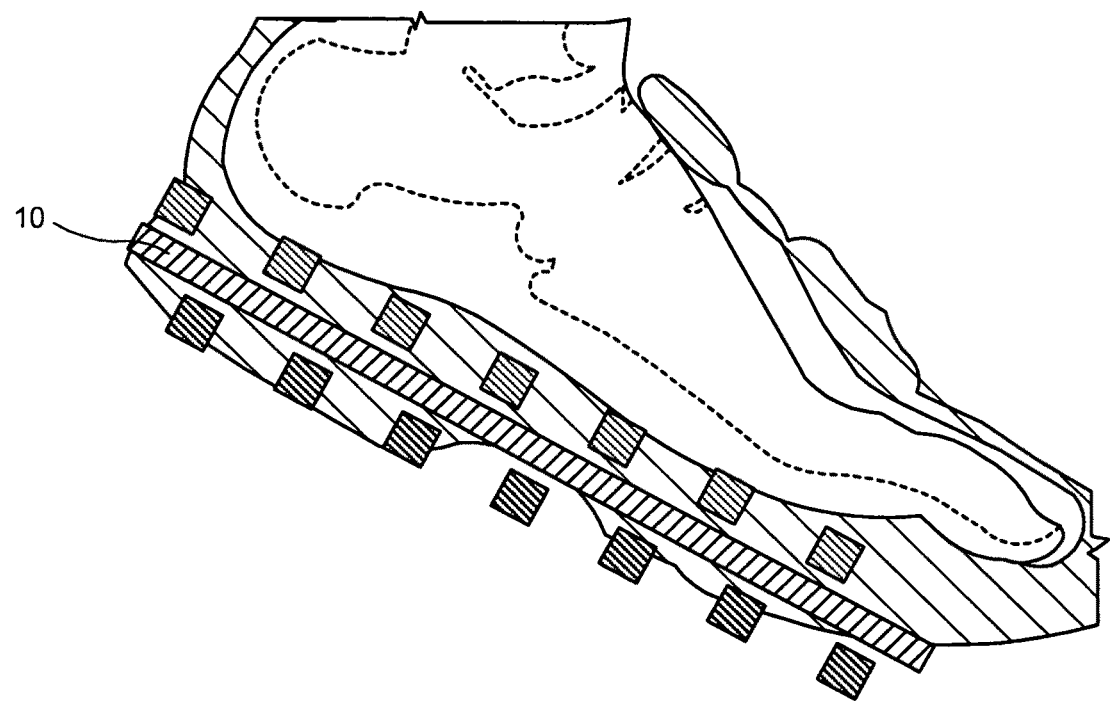
FIG. 2 shows installation of the ultra-resilient shoe pad within a shoe, according to one embodiment of the invention.
Figure 3:
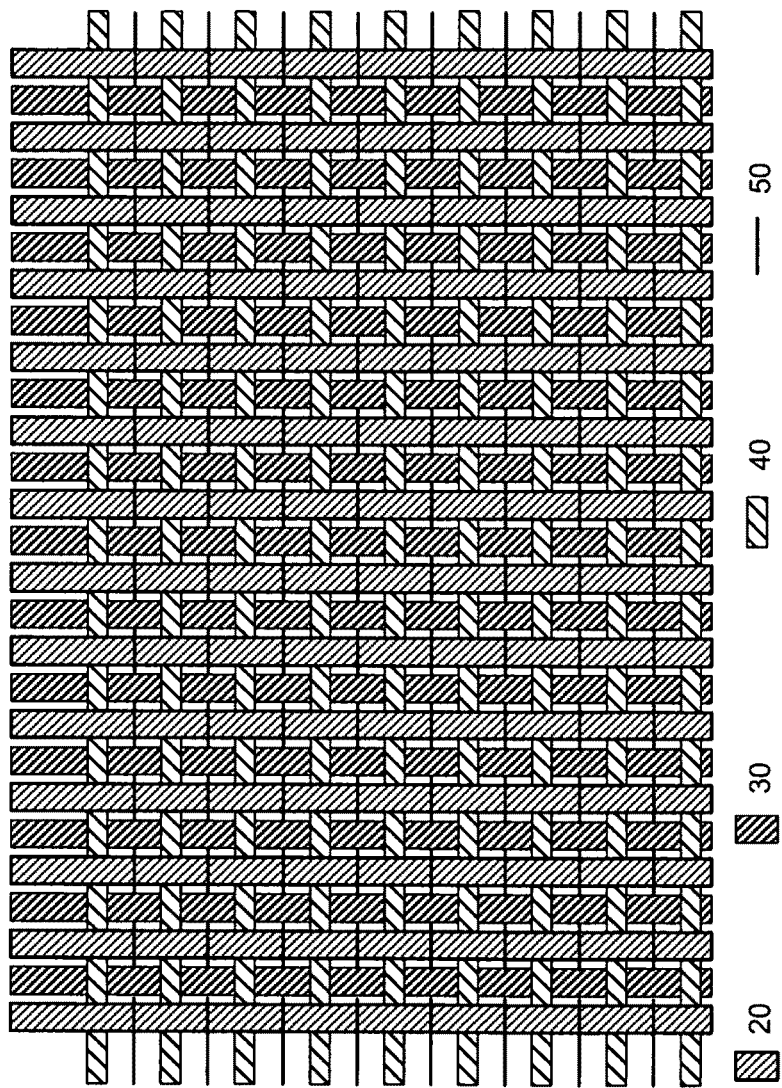
FIG. 3 shows a woven structure, according to one embodiment of the invention.

One embodiment of the invention is shown in FIG. 1, which is a shoe pad 10 for use in shoes such as sports shoes, running shoes, regular shoes, boots etc. FIG. 2 illustrates the installation of the shoe pad 10 into foot wear, for example, a shoe. FIG. 3 is a 'top view' of the structure according to one example of the invention, also referred to as the base fabric, looking from above the fabric. FIG. 3 illustrates the use of functional yarns 20, 30 in one direction, for example a longitudinal direction of the fabric, layered both over as well as under the elastic media 40 in the cross-direction. Functional yarns can include any type of yarns (as in single monofilaments, multifilaments, texturized multifilaments, etc.) or combined structures (twisted, plied, knitted, braided of any number of materials or fabrics, composites, etc.), as known by ordinarily skilled artisans.

The elastic media 40 may be polyurethane, rubber or Lycra or any deformable material that has sufficient elasticity as well as strength to allow the structure to rebound, or 'spring back.' The structure 10 may be made in a 90 degree fashion, switching the longitudinal and cross direction yarns. It is to be noted that yarns/material/bands/cords 20, 30 are offset in the total structure 10 in order to allow the longitudinal sections to compress almost completely without interfering with one another in order to form a planar structure still with open area, so as to allow permeability. The entire structure 10 can be 'bound' together utilizing "binder picks" 50 as shown in FIG. 3, or another yarn that is woven into the structure in order to bind it together in order to allow further processing of the 'base fabric.' Other means such as for example adhesives, welding technology or laser bonding can also be utilized for this function of holding the structural yarns together.

The longitudinal yarns can be single in nature (as in single monofilaments, multifilaments, texturized multifilaments, etc.) or combined structures (twisted, plied, knitted, braided of any number of materials or fabrics, composites, etc.), as known by ordinarily skilled artisans. They can be permeable or impermeable to fluid. They can be comprised of polyesters, polyurethanes, polyamides, polyolefins, metals, rubber, Lycra etc. or combinations thereof.

A yarn that is defined as elastomeric in its length or axial direction is required for all the embodiments discussed. The yarn can also be elastomeric in its through thickness direction as well. The yarn can have any form as appropriate for the application and can be, for example, single monofilament, plied monofilament or a multifilament, wrapped yarns of different materials etc. It can be plied, twisted, knitted or braided. It can have any round or non-round cross sectional shape including square or rectangular as shown. Examples of good elastomeric materials are polyurethane, rubber or that sold under the trademark Lycra. The foregoing applied to all yarns referred to herein.

The fabric can be needled, if necessary, with fibers to produce a smooth surface, and can be coated with foams, coatings, or particulates. Other forms include a membrane, a yarn array, or another yarn fabric can be laminated to the fabric. The structure which includes these elastomeric yarns must be constructed to have sufficient degree of compressibility as well as have sufficient elasticity as well as strength to allow the structure to rebound, or 'spring back.' The compression and rebounding of the structure has the following benefits:

1.) Improved recovery characteristics over memory foams, gels, spring systems, etc,
2.) Smooth and uniform surface characteristics in, for example, items having 'planar,' crossless structure of yarns. (e.g.: to allow for improved support of the shoe and the foot).
3.) Excellent retention of the recovery/dampening characteristics due to the elastic material's 'full' recovery within the structure (as opposed to straight compression of materials). This is due to the structure providing support between the sections of the elastic material; this avoids 'overstressing' the material, keeping it 'alive' (e.g., for a longer useful lifetime).
4.) Excellent resistance to moisture damage or problems due to water holding due to self-cleaning effect of compression and recovery.
5.) Excellent compression recovery vs. weight ratio, allowing significant dampening capability with light weight.
6.) Excellent 'breatheability' of the shock absorbing structure, allowing perspiration and other moisture to evaporate and/or be removed at compression.

The structure 10 can be woven flat, endless, or compiled in another manner known to one of skill in the art. The indexing of the said longitudinal layers (or cross-direction layers if oriented in the other direction) can be critical, as the spacing of the structure must allow a uniform compression of the yarns into one another, thus allowing a uniform behavior over the entire length and width of the structure. It is to be noted that the structure can also be built without weaving, by subsequently laying said yarns perpendicular to one another as shown in FIGS. 4 and 5 and properly indexing in order to result in the finished structure. These yarns can be fixed in place via adhesives, welding techniques (laser and/or ultrasonic, for instance), or adhered with other welding and/or gluing techniques. Numerous layers can also be stacked in a perpendicular or angled fashion over each other to create a thicker, even more compressible structure.

The invention, according to one embodiment, is a 'carpet pad' that utilizes a unique structure 60 which provides extremely elastic behavior under load with high caliper recovery. This structure 60, for example shown in FIG. 7, utilizes an elastic media 140 in one direction of a woven fabric which allows the entire structure to 'collapse' into itself, based primarily upon the elasticity of this media 140 and the base fabric structure to confirm under pressure, thus allowing this unique behavior.

FIG. 7 is a 'top view' of the structure according to the invention, also referred to as the base fabric, looking from above the fabric. Yarns 120, 130 are used in one direction, for example a longitudinal direction of the fabric, layered both over as well as under the elastic media 140 in the cross-direction. The elastic media 140 may be polyurethane, rubber or Lycra or any deformable material that has sufficient elasticity as well as strength to allow the structure to rebound, or 'spring back.' The structure 60 may be made in a 90 degree fashion, switching the longitudinal and warp yarns. It is to be noted that yarns/bands/cords 120, 130 are offset in the total structure 60 in order to allow the longitudinal sections to compact totally without interfering with one another in order to form a planar structure still with open area, so as to allow permeability. The entire structure 60 can be 'bound' together utilizing "binder picks' 150 as shown in FIG. 7, or another yarn that is woven into the structure in order to bind it together in order to allow further processing of the said 'base fabric.' Other means such as for example adhesives, welding technology or laser bonding can also be utilized for this function.

The longitudinal yarns can be single in nature (as in monofilaments, multifilaments, texturized multifilaments, etc.) or combined structures (twisted, plied, knitted, etc.). They can be permeable or impermeable to fluid. They can be comprised of polyesters, polyurethanes, polyamides, polyolefins, metals, rubber, Lycra etc. or combinations thereof. The fabric can be needled, if necessary, with fibers to produce a smooth surface of the fabric, and/or can be coated with foams, resin or latex coatings, or particulates. The structure that contains the elastomeric yarns must allow the structure to compress and rebound, or 'spring back.' The rebounding of the structure has the following benefits:

1.) Improved recovery characteristics over memory foams, gels, spring systems, etc.

2.) Smooth and uniform surface characteristics due to 'planar,' crossless structure of yarns (e.g., to provide improved support of the carpet/sport floor/floor material).

3.) Excellent retention of the recovery/dampening characteristics due to the elastic material's 'full' recovery within the structure (as opposed to straight compression of materials). This is due to the structure providing support between the sections of the elastic material; this avoids 'overstressing' the material, keeping it 'alive.' This provides, inter alia, a longer useful lifetime.

4.) Excellent resistance to moisture damage or problems due to the water holding due self-cleaning effect of compression.

The structure 60 can be woven flat, endless, or compiled in another manner known to one of skill in the art. The indexing of the said longitudinal layers (or cross-direction layers if woven in the other direction) may be critical, as the spacing of the structure must allow a uniform compression of the yarns into one another, thus allowing a uniform behavior over the entire length and width of the structure. It is to be noted that the structure can also be built without weaving, by subsequently laying said yarns perpendicular or angled to one another and properly indexing in order to result in the finished structure. These yarns can be fixed in place via adhesives, welding techniques (laser and/or ultrasonic, for instance), or adhered with other welding and/or gluing techniques. Numerous layers can also be stacked in a perpendicular fashion or angled over each other to create a thicker, even more compressible structure.

In yet another embodiment, the layers of a fabric may each be formed by mixing different weave repeats or shed patterns. By way of background, in float weaving, a warp yarn is threaded through a heddle, and the weave pattern is created by raising and lowering the heddle position for each yarn in the warp direction before the shute or pick is inserted into the shed created by raising or lowering the warp yarns. The number of yarns intersected before a weave pattern repeats is known as a shed, or harness. With this understanding, a plain weave utilizes, for example two sheds in a loom for changing the warp yarn positions, and can therefore be termed a two shed weave pattern. Accordingly a fabric can be comprised of a 2, 4, 6, 8 shed pattern and so on.

Figure 8:
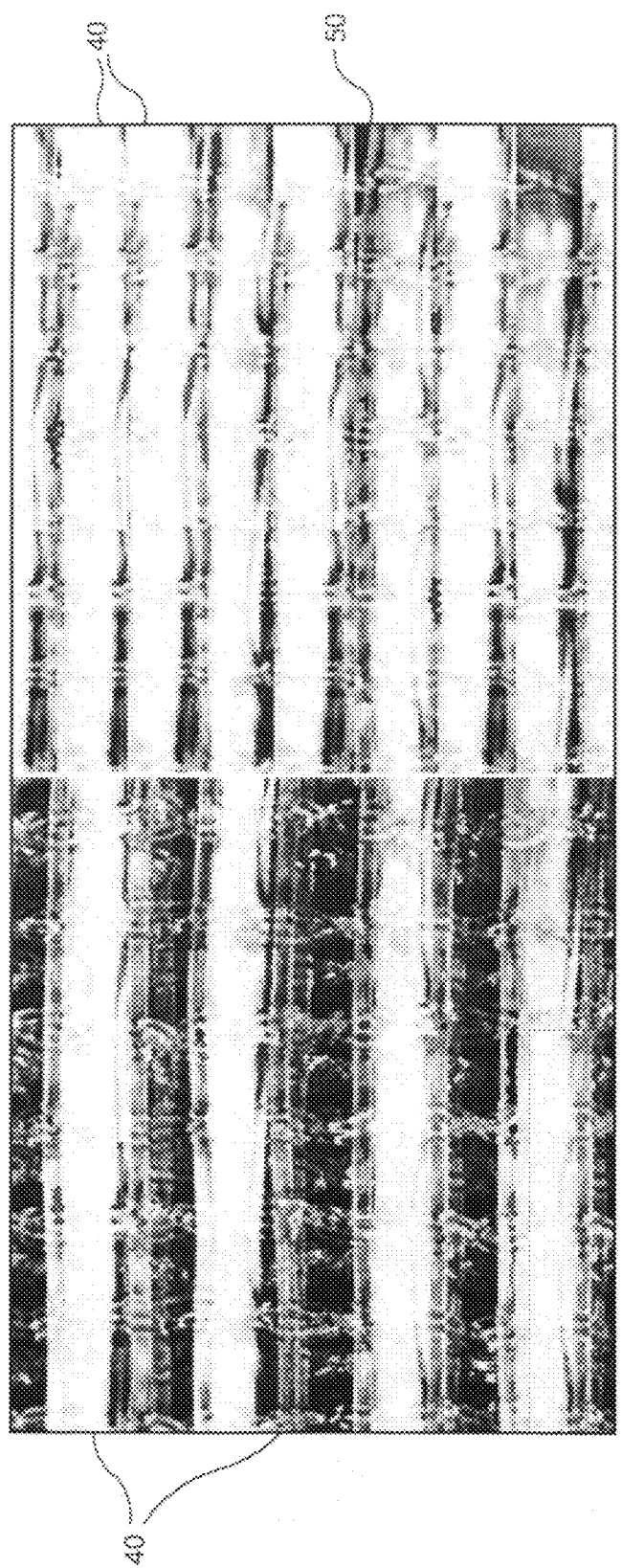
FIG. 8 shows another structure according to another embodiment of the invention.

FIG. 8 shows 2-shed pattern with a 0.35 mm shute yarn; the figure showing two differing densities for the elastomeric yarn 40 and the binder yarn 50. For weaving a 2-shed surface for, for example, a 5-layer fabric with an elastomeric yarn 18, a 16 harness (16/4=4, 4/2=2 shed) pattern can be used. In another example, a 2-layer 4/8-shed weave can have a 4 ply Lycra® yarn as a shute.

Figure 9:
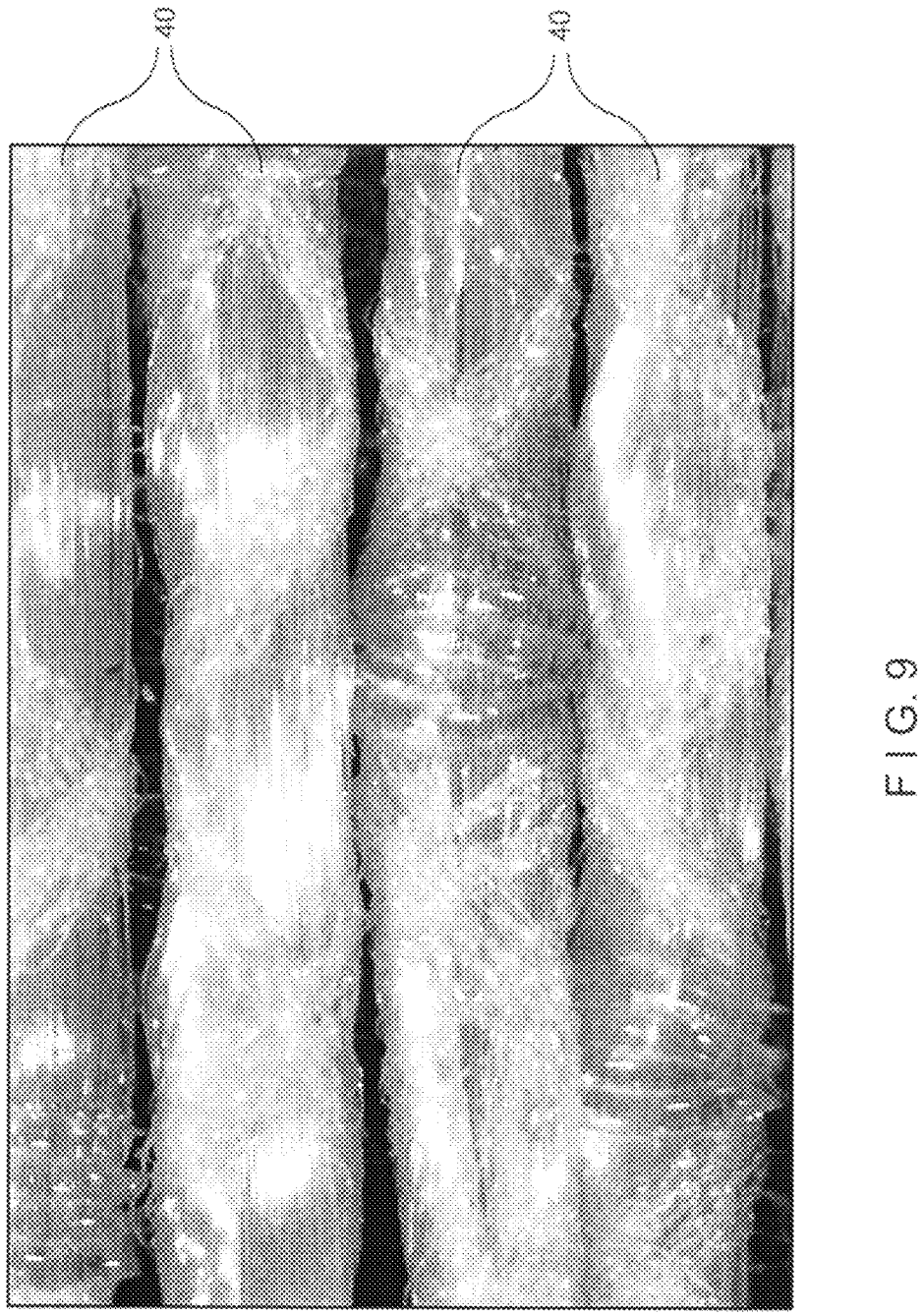
FIG. 9 shows an embodiment of the invention including a multi-component wound yarn comprising elastomeric material.
Figure 10A:
FIGS. 10A and 10B show embodiments of laminated structures of the fabric.
Figure 10B:
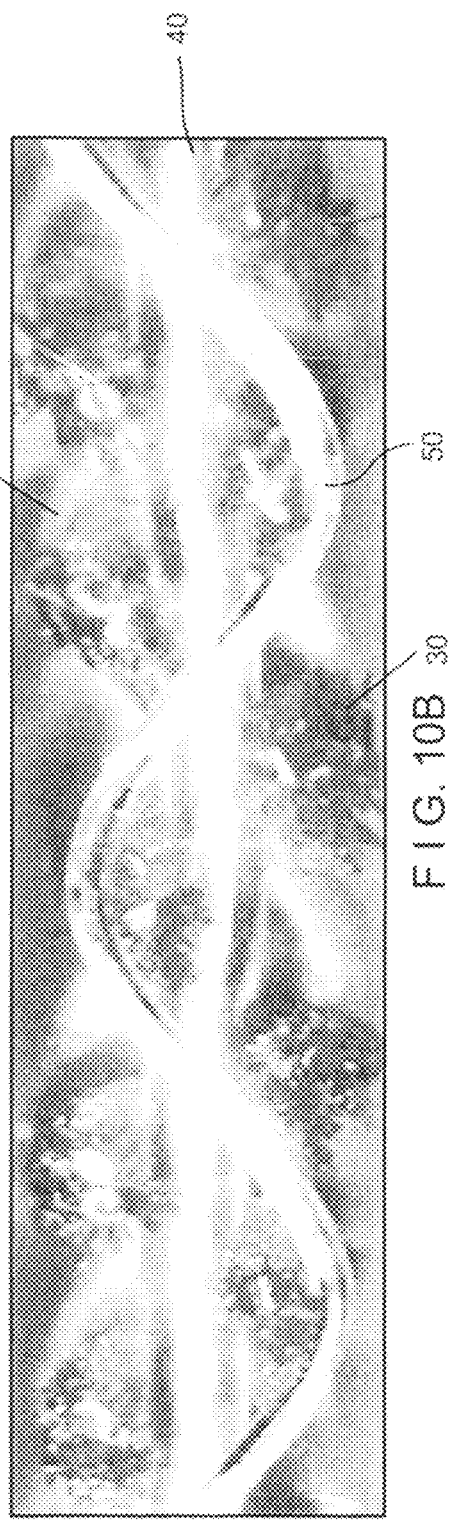

Illustrating other embodiments of the structure, at FIG. 9 is shown the multi-component wound yarn comprising elastomeric material 40 for a multi-layer fabric having a 2 layer construction. At FIGS. 10A and 10B are shown embodiments of laminated structures of the fabric. FIG. 10A shows a base structure with the elastomeric yarn 40 and functional yarns 20, 30 laminated between two fabrics.

FIG. 10B shows a woven "crossless" base. The base shows the elastomeric yarn 40 and the functional yarns 20 and 30 as well as a binder yarn 50. Also contemplated are other embodiments where the elastomeric yarn can be a knitted yarn, or a hooked loop yarn.

For the embodiment including a hooked loop yarn, a fabric can be adapted to, for example, readily attach and replace fabric surfaces that are worn due to the stresses pads and structures undergo. In another example, a fabric can have surfaces that are exchangeable, thus allowing the same fabric to be put to different uses, such as a sports floor where different surfaces are desired for different sports.

Figure 11:
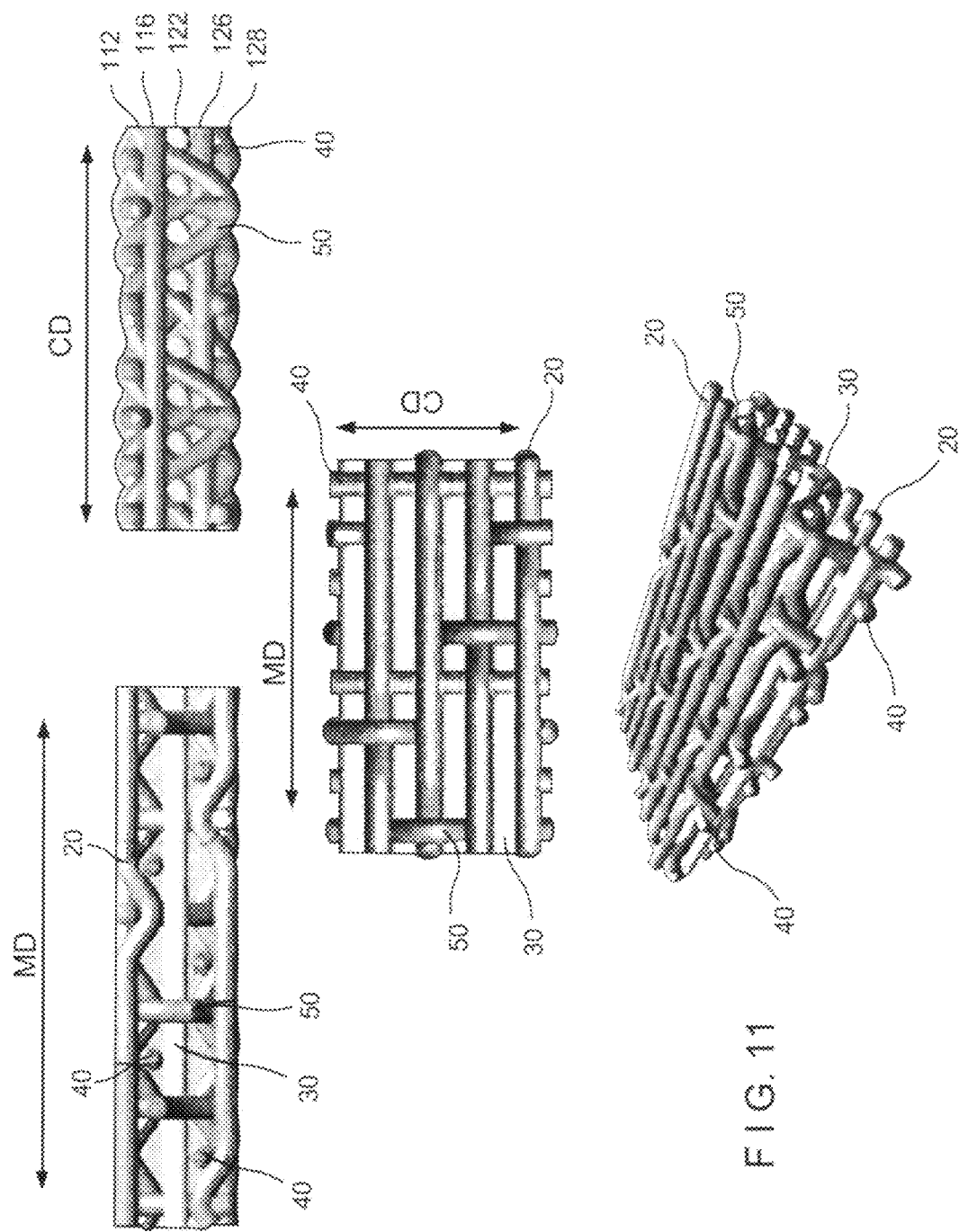
FIG. 11 shows an embodiment of the invention including 5-layer compressible resilient fabric comprising a warp binder.

In another embodiment, FIG. 11 shows a 5-layer compressible resilient fabric comprising a warp binder 50. The array 116 including the elastomeric yarn 40 running in the warp direction is positioned between the first array 112 and the third array 122. A fourth layer 126 including elastomeric yarns 40 has the yarns positioned such that they are in alternating spaces in the vertical plane from the parallel elastomeric yarns of the second layer 16. The yarns 20 of the fifth layer 128 are the same vertical plane the yarns 20 of the first layer 112. As shown in figures, each warp direction binder yarn 50 alternately weaves under and over three parallel yarns in the first and fifth layers, and is spaced in the shute direction such that long floats are created by each of the yarns 20 of the first layer 112 and the fifth layer 128. As shown, the elastomeric yarns are inside a double layer weave construction, which can use a 16 harness as for endless weaving or an 8 harness weave for flat weaving. The fabric woven in accord with the embodiment can use the single monofilament warp yarns or 4 ply yarns or other yarn types. It is also possible to use two different warp yarns, a coarser warp including the elastomeric yarn 40, and a shorter, smaller warp for the binder yarn 50. A fabric structure as shown in FIG. 11 was used with two separate warp beams. However, if two warps are not desired, the fabric/structure can also be configured to include a small binder yarn with elastomeric warp yarns and the crossover yarns woven over the elastomeric warp yarns.

Figure 12:
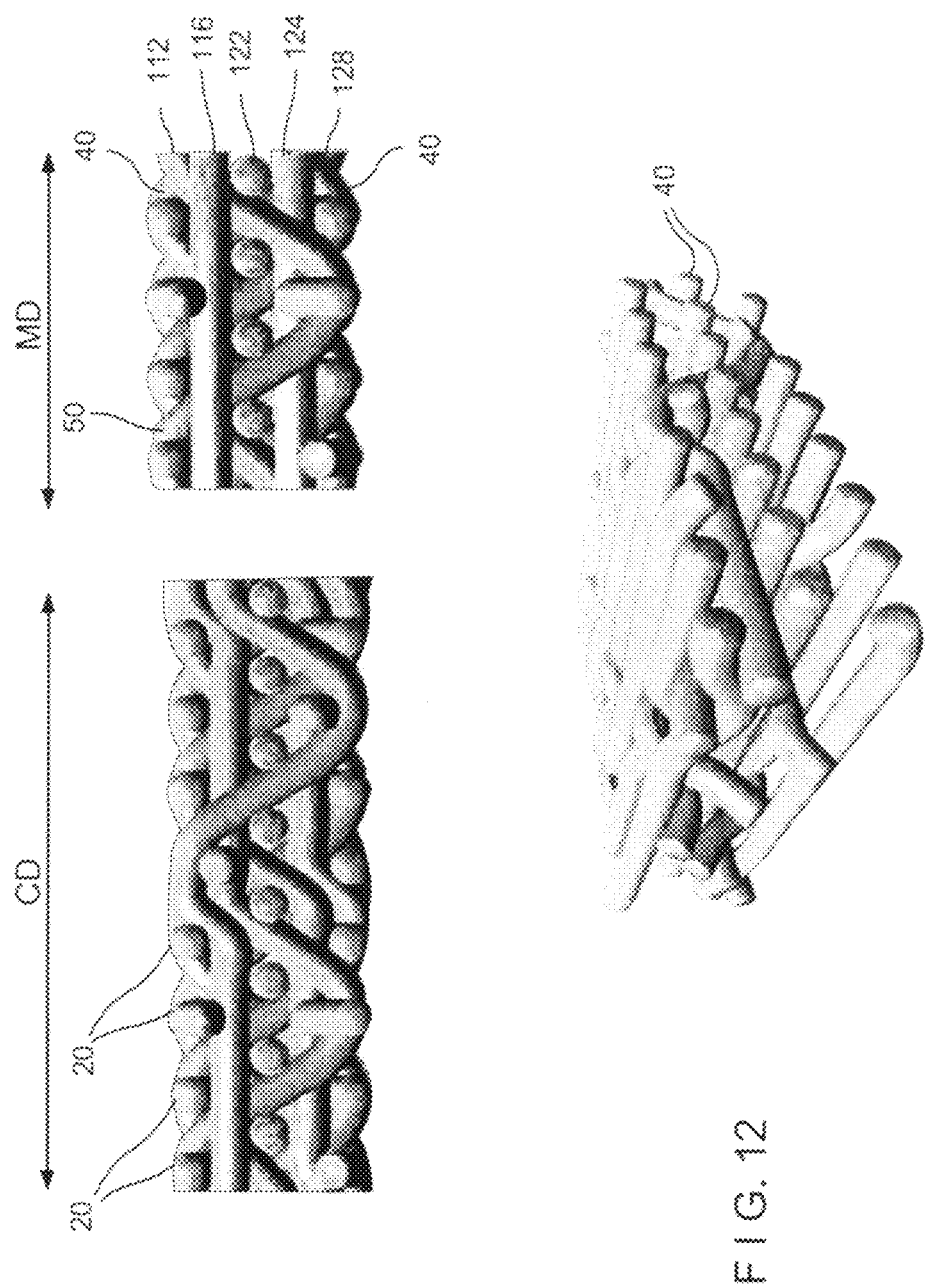
FIG. 12 illustrates another embodiment of the invention including a weaving in of the warp yarns.
Figure 13A:
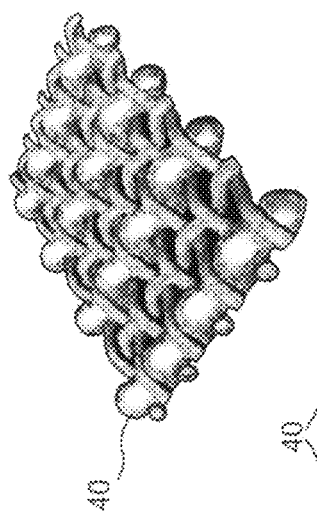
FIG. 13 another embodiment of the invention.
Figure 13B:
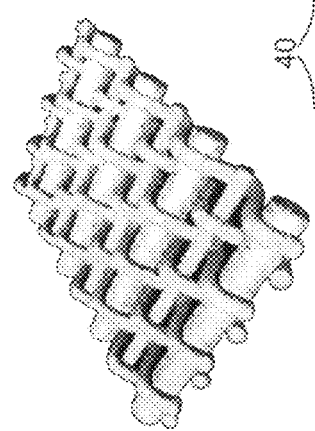
Figure 13C:
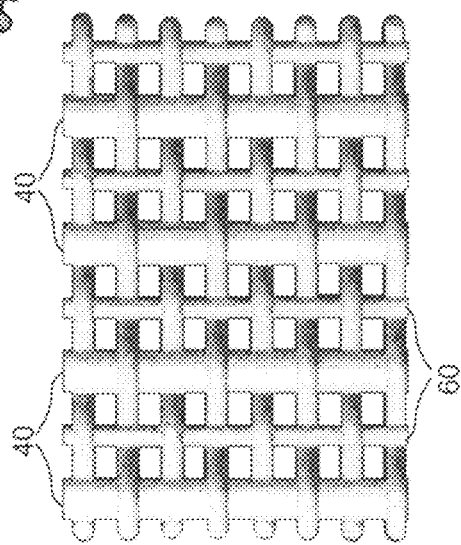
Figure 13D:
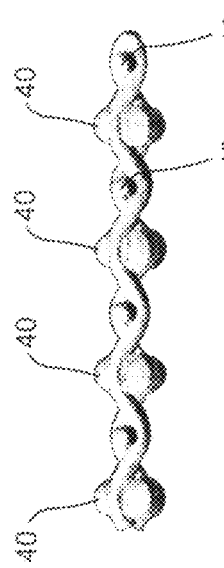
Figure 13E:
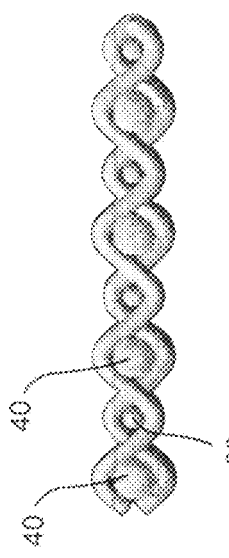

FIG. 12 illustrates another embodiment including a weaving in of the warp yarns. As shown therein four ends of yarns 20 the first layer 112 weave above the layers 116, 122, 126 of elastomeric yarns 40, and changes over to a two-layer binder every second repeat, and four ends of yarns 20 weaving under the layers 116, 122, 126 and changes over to a two-layer binder every second repeat. Each layer need not be composed of elastomeric yarns. Rather, yarns may or may not be present depending on the degree of compressibility desired.

FIG. 13 shows yet another embodiment. FIGS. 13A, 13C and 13D show an uncompressed state, whereas 13B and 13E show a compressed state. In the figures, a single layer includes elastomeric yarns 40, here shown as elastomeric shutes 40, and functional yarns 60 in the same direction and alternating with the elastomeric yarns 40. The elastomeric yarn 40 is larger than the functional yarn 60. As shown, the elastomeric yarns 40 and functional yarns 60 can be in the shute direction; the fabric layer could also be adapted to include the larger elastomeric yarns 40 in a warp direction, as, for example, in a multiaxial fabric. As shown by, inter alia, the comparison at FIGS. 14D and 14E, the fabric is rendered compressible and resilient, even with a single layer construction. Also, by manipulating the shute and warp tensions, straighter warp yarns crossing the elastomeric yarns can be achieved.

Modifications to the present invention would be obvious to those of ordinary skill in the are in view of this disclosure, but would not bring the invention so modified beyond the scope of the appended claims.

The invention claimed is:

1. A compressible resilient pad, the pad having an original thickness and includes a structure comprising:
 a plurality of parallel warp yarns;
 a plurality of parallel shute yarns;
 wherein either or both of shute yarns or warp yarns are comprised of an axially elastomeric material,
 wherein the structure is a laminated structure comprising:
 a first layer of the parallel yarns running in either the warp or the shute direction;
 a second layer of the parallel yarns on one side of the first layer, the second layer's yarns running in the warp or shute direction different from that of the first layer and comprising the elastomeric yarns; and
 a third layer of the parallel yarns on the opposite side of the second layer as the first layer and running in the same direction as those of the first layer,
 wherein the parallel yarns of the third layer are aligned such that the parallel yarns of the third layer nest between the parallel yarns of the first layer without interfering with one another to allow the structure to compact to form a planar structure in a through thickness direction when the pad is under a pressure load;
 wherein the elastomeric yarns are elastic in their through thickness direction and length or axial direction such that under the pressure load the elastomeric yarns stretch and compress to conform to the nesting and, the structure springs back to substantially the original thickness after removal of the pressure load.

2. The pad of claim 1 wherein the structure comprises:
 a binder yarn.

3. The pad of claim 1 wherein the number of yarns in the third layer is less than the number of yarns in the first layer.

4. The pad of claim 1 wherein the yarns of the second layer are orthogonal to those of the first and third layers.

5. The pad as claimed in claim 1, wherein the elastomeric yarn including the elastomeric material is selected from the group consisting of: a monofilament, a multifilament, a plied monofilament, a wrapped yarn, a knitted yarn, a hooked loop yarn, a twisted yarn, a multicomponent yarn, and a braided yarn.

6. The pad as claimed in claim 1, wherein the elastomeric yarn is selected from the group consisting of: a polyurethane and rubber.

7. The pad as claimed in claim 1, wherein the elastomeric yarn is selected from yarns having a cross-section of differing geometric configurations.

8. The pad as claimed in claim 7, wherein the elastomeric yarn is selected from the group consisting of: round, non-round, square, rectangular, elliptical, and polygonal.

9. The pad of claim 2 wherein the binder yarn and the elastomeric yarn are in the same direction.

10. The pad of claim 2 wherein the direction of the elastomeric yarn and the binder yarn are the warp.

11. The pad of claim 10 wherein the layer of elastomeric yarns are inside a double layer construction.

12. The pad of claim 10, wherein the structure includes elastomeric yarns composed of a warp coarser than the the binder yarn.

13. The pad of claim 10 wherein the structure comprises:
 the elastomeric yarns in the warp;
 the shute yarns over the elastomeric yarns; and
 wherein the binder yarns are smaller than the elastomeric yarns.

14. The pad of claim 1 wherein the structure comprises:
 a single layer including the elastomeric yarn, and
 a functional yarn in the same direction and alternating with the elastomeric yarn,
 wherein the elastomeric yarn is larger than the functional yarn.

15. The pad of claim 1 wherein structure is either a final product or the structure can be a component of another structure.

16. The pad of claim 1 wherein the pad is included in or is a product selected from the group of products including:
 footwear; shoes; athletic shoes; boots; flooring; carpets; carpet pads; sports floors; automobile parts; composites; subfloors; gymnasium subfloors; sports arena subfloors; press pads; ballistic cloth; body armor; hurricane window protection; padding; sporting equipment padding; baseball catcher chest protectors; knee/elbow pads; hip pads; wall padding; shoe inserts and orthotics; heels/soles for athletic shoes; a cushioning layer for bedding, and vehicle seats.

17. The pad of claim 1 or 16 wherein the structure includes a material that allows a surface to be exchangeable.

* * * * *